United States Patent
Clayton

(10) Patent No.: US 7,107,382 B2
(45) Date of Patent: Sep. 12, 2006

(54) VIRTUAL PERIPHERAL COMPONENT INTERCONNECT MULTIPLE-FUNCTION DEVICE

(75) Inventor: Shawn Adam Clayton, Boylston, MA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 152 days.

(21) Appl. No.: 10/407,031

(22) Filed: Apr. 3, 2003

(65) Prior Publication Data

US 2004/0199700 A1 Oct. 7, 2004

(51) Int. Cl.
*G06F 13/00* (2006.01)
*G06F 13/12* (2006.01)
*H04L 29/04* (2006.01)
*H04L 1/00* (2006.01)

(52) U.S. Cl. ............ 710/305; 710/72; 710/22; 710/313; 712/29

(58) Field of Classification Search ......... 710/305, 710/313–315, 100, 10, 8, 22, 104, 72, 105; 712/29; 709/220, 250, 253; 711/118; 370/251, 370/257, 401–402; 340/825.5
See application file for complete search history.

(56) References Cited

U.S. PATENT DOCUMENTS

| | | | |
|---|---|---|---|
| 5,610,601 A * | 3/1997 | Lahti et al. ............. | 341/22 |
| 5,636,368 A * | 6/1997 | Harrison et al. ......... | 716/16 |
| 5,764,924 A * | 6/1998 | Hong ...................... | 710/300 |
| 5,768,619 A | 6/1998 | Roberts | |
| 5,884,027 A * | 3/1999 | Garbus et al. ........... | 709/250 |
| 6,023,736 A | 2/2000 | Lambeth et al. | |
| 6,073,253 A * | 6/2000 | Nordstrom et al. ...... | 714/25 |
| 6,275,888 B1 | 8/2001 | Porterfield | |
| 6,629,001 B1 * | 9/2003 | Vadivelu .................. | 700/94 |
| 6,647,434 B1 * | 11/2003 | Kamepalli ............... | 710/14 |

OTHER PUBLICATIONS

"Bus architecture of a system on a chip with user-configurable system logic" by Winegarden, S. (abstract only) Publication date: Mar. 2000.*
"New custom computing machine dedicated to fast dynamic configuration applications" by Rabel, C.E.; Sawan, M. (abstract only) Publication Date: Sep. 5-8, 1999.*
Published Patent Application titled "computer system multifuncvtional logic module—uses dual variable inputs to realise four logic functions" by Ivanov et al. (front page only) Publication Date: Jan. 15, 1988.*
Peripheral Component Interface (PCI) Specification, Revision 2.2, Dec. 18, 1998, PCI Local Bus, PCI Special Interest Group, http://www.pcisig.com, © 1992, 1993, 1995, 1998.
PCI-X Addendum to the PCI Local Bus Specification, Revision 1.0a, Jul. 24, 2000, PCI Special Interest Group, http://www.pcisig.com, © 1999, 2000.

* cited by examiner

*Primary Examiner*—Gopal C. Ray
(74) *Attorney, Agent, or Firm*—Morrison & Foerster LLP

(57) ABSTRACT

A peripheral component interconnect (PCI) device comprising a bus interface coupled to a component interconnect bus, a plurality of configuration space register sets, and virtual multiple-function logic. Each set of configuration space registers is associated with a function. The virtual multiple-function logic is coupled to the bus interface and the configuration space register sets. The virtual multiple-function logic provides access to a plurality of configuration space registers for a plurality of functions. The virtual multiple-function logic also enables a plurality of functions to share the bus interface and other internal logic.

22 Claims, 4 Drawing Sheets

VIRTUAL PERIPHERAL COMPONENT INTERCONNECT MULTIPLE-FUNCTION DEVICE

BACKGROUND

The Peripheral Component Interconnect (PCI) Local Bus specification relates to a 32-bit or 64-bit bus for transferring data between a microprocessor or central processing unit (CPU) and one or more peripheral devices. Peripheral devices, such as disk drives, may be integrated directly onto a motherboard. Other peripheral devices may be added through PCI expansion cards, such as multimedia, graphics, video, audio, and local area network (LAN) cards.

A PCI "device" is an electrical component that conforms to the PCI specification for operation in a PCI bus environment. Every PCI "device" (except host bus bridges) that conforms with the PCI specification should implement "Configuration Address Space" (also called "Configuration Space"). Configuration Space is a specific set of registers used for configuration, initialization and error handling.

Each PCI "device" may have one or more "functions." For example, a single device may have two "functions": one "function" relates to a SCSI bus controller, and another "function" relates to an Ethernet controller. Multiple "functions" may also perform the same task, such as a plurality of Ethernet controllers each being a separate "function" of a single "device." The PCI specification defines a "function" as a "set of logic that is represented by a single Configuration Space." The PCI specification defines each "function" to have a separate configuration register space, such as a unique 256-byte space, and logic associated with the function. Each function's unique configuration space may be accessed differently than input/output (I/O) or Memory Address Spaces.

A single PCI device may have multiple "functions." A "multi-function device" should provide a Configuration Space for each function, and thus have multiple Configuration Spaces. Each "function" in a "multi-function device" may be treated as a completely separate device for the purposes of PCI functionality, e.g., each function has its own set of configuration space registers.

In a conventional PCI device, the device's logic may typically be associated on a one-to-one basis with each function's configuration space. In a conventional multi-function PCI device, each function may have a register set that controls the operation of the logic associated with the function.

The PCI-Extended (PCI-X) Addendum to the PCI Local Bus Specification has improvements that enhance the speed and efficiency of the PCI bus. A "function" according to the PCI/X addendum specifies a set of behaviors and a set of registers required for PCI/X compliance.

SUMMARY

The application relates to a virtual Peripheral Component Interconnect (PCI) multi-function device and methods of using the same. The PCI multi-function device may have a number of advantages. For example, the PCI device may implement multiple functions without implementing separate internal resources for each function. There may be no real hardware distinction between one function's data transfer between a host and a PCI device and another function's data transfer between the host and the PCI device. A distinction may be evident at a level other than hardware under the control of firmware. Multiple functions of the device may share internal resources, which may allow a reduction in the device's logic. The reduced logic may allow the PCI device to be smaller and less expensive than a PCI device with dedicated resources for each individual function. This may be especially true in device designs that implement a large number of functions, where some of the functions are either infrequently used or are not active (enabled) at all.

In addition, the virtual PCI multi-function device may address the problem of having a plurality of different sets of PCI configuration values that control the behavior of a single aggregate device.

An aspect of the application relates to a system comprising a virtual PCI multi-function device.

Another aspect relates to a method of sharing a number of internal resources between a plurality of functions of a PCI device, while still meeting the PCI functional requirements.

The details of one or more embodiments are set forth in the accompanying drawings and the description below. Other features and advantages will be apparent from the description and drawings, and from the claims.

DETAILED DESCRIPTION

Figure 1:
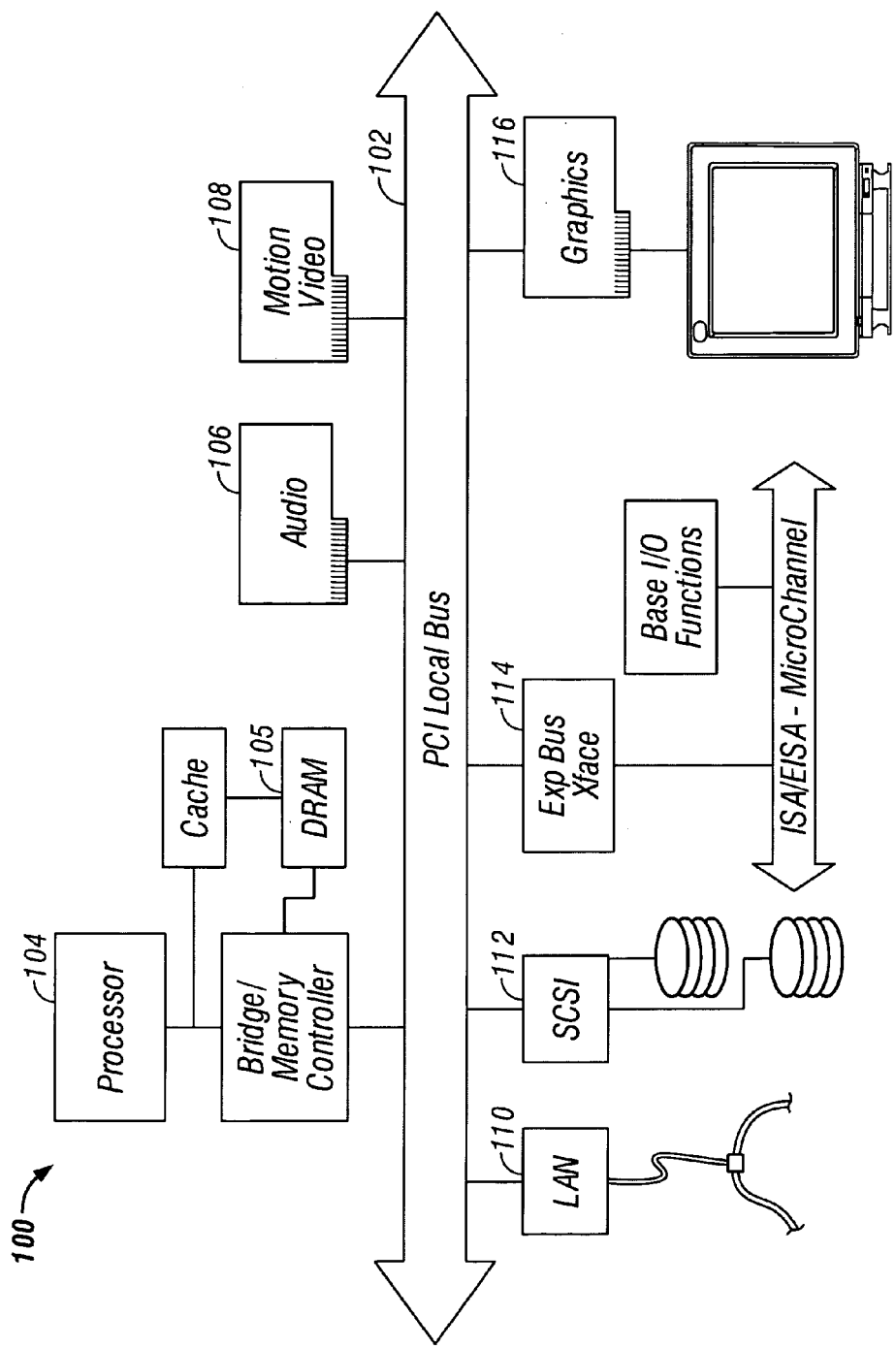
FIG. 1 illustrates an example of a Peripheral Component Interconnect (PCI) system.

FIG. 1 illustrates an example of a Peripheral Component Interconnect (PCI) system 100. The PCI system 100 may include a PCI (or PCI-X) local bus 102, a processor 104 and a plurality of PCI devices 106–116.

Figure 2:
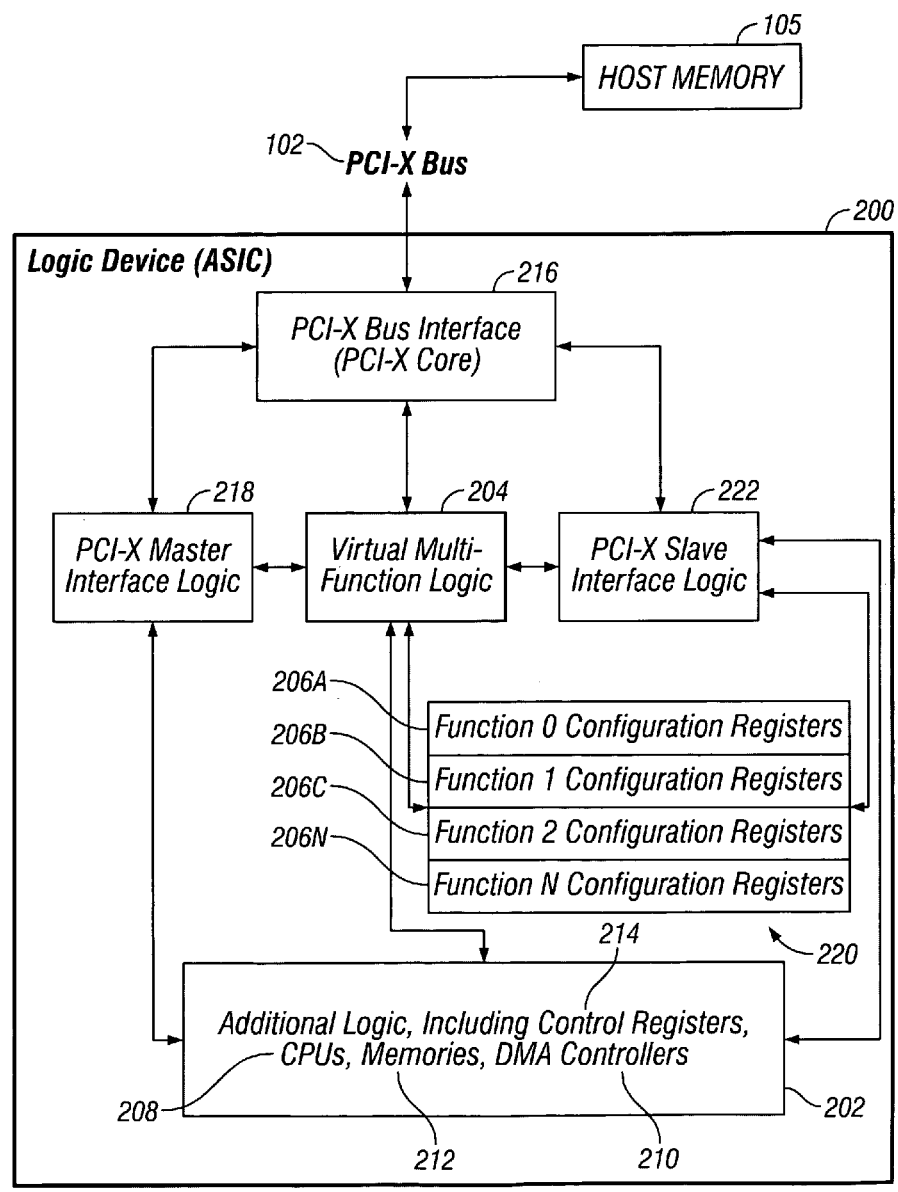
FIG. 2 illustrates a PCI device including device logic, virtual multi-function logic and a plurality of function registers.

FIG. 2 illustrates a PCI logic device 200 coupled to the PCI/PCI-X bus 102 of FIG. 1. The PCI logic device 200 may be an application specific integrated circuit (ASIC). The logic device 200 in FIG. 2 may include a PCI-X bus interface (also called a "PCI-X core") 216, PCI-X bus master interface logic 218, virtual multi-function logic 204, PCI-X bus slave interface logic 222, additional device logic 202 and a plurality of configuration space function registers 206A–206N. The additional device logic 202 may include one or more control registers 214, CPUs 208, memories 212 and direct memory access (DMA) controllers 210. Some of the components in FIG. 2 may overlap and may comprise hardware, software and/or firmware. For example, the virtual multi-function logic 204 may be integrated with the other device logic 216, 218, 222, 202 and the configuration spaces of each "function," and is not a separate block as shown in FIG. 2.

The PCI-X bus interface/PCI-X core 216 may be a block of hardware that handles data communication between a host system and the PCI device 200. For example, the PCI-X core 216 may implement the PCI-X bus protocol. The PCI-X core 216 provides an interface between internal logic 218, 204, 202, 222 and the PCI bus 102.

The DMA controller 210 may handle data transfers between a host system memory 105 and on-chip memory 212.

The bus master interface logic 218 may handle bus operations of the PCI device 200.

The virtual multi-function logic 204 comprises logic circuits that allow the PCI-X core 216, PCI-X bus master interface logic 218, PCI-X bus slave interface logic 222 and additional device logic 202 to access the function registers 206A–206N. The virtual multi-function logic 204 comprises logic circuits that deal with how the multiple functions registers 206A–206N may be used to control associated shared logic 216, 218, 202.

The function registers 206A–206N may constitute a PCI device's "configuration space" 220. The PCI device 200 may have five "functions," which include logic and five configuration space register sets 206A–206N that the PCI device 200 may implement. A host software driver (e.g., at processor 104 in FIG. 1) communicates with the PCI device 200 through one of the device's "functions." For a "multi-function device," there may be different host drivers for the functions, i.e., one host driver for each "function." The multiple "functions" may all provide the same set of "features," or they may provide different features. For example, one "function" may relate to a SCSI bus controller, and another "function" may relate to an Ethernet controller. Multiple "functions" may also perform the same task, such as a plurality of Ethernet controllers each being a separate "function" of a single "device." The actual feature that a function provides may be unimportant for this application.

Each of the five "functions" may be treated as a completely separate "device" for the purposes of PCI functionality, e.g., each function has its own set of configuration space registers 206. The PCI specification requires each "function" to have its own set of separate configuration space registers 206. But the five functions are implemented by the same PCI "device" 200.

The "virtual" nature of the virtual multi-function logic 204 allows multiple functions to work correctly in compliance with PCI requirements (e.g., each function has a set of configuration space registers 206) and allows multiple functions to share a single instance of a number of internal resources (also called "logic"). The internal resources may be the PCI-X bus interface or PCI-X core 216, the bus master interface 218, the bus slave interface logic 222 and additional logic 202.

The virtual multi-function logic 204 considers the values of all the functions' registers 206A–206N, and causes the registers 206A–206N to control the shared logic (internal resources) 216, 218, 222, 202 associated with the multiple functions. The functions may be called "virtual" because there is no real (dedicated) logic associated with each function. Each "function" may be formed by the configuration register space. The logic, CPUs and firmware of the device 200 may be shared by the "functions," but only a subset of the logic may be directly tied to control by the configuration space registers 206A–206N.

There may be a number of parameters that control the allowable operation of the PCI-X bus interface 216. The parameters may be programmed into the configuration space of each function. A unique aspect of the virtual multi-function logic 204 is its ability to handle different or conflicting settings in the different functions, in order to provide a single consistent set of controls for the shared hardware, e.g., PCI-X core 216 and DMA controller 210. For example, if two different functions have been programmed with different values for the cache line size register, the virtual multi-function logic 204 may select a single value for the cache line size. The virtual multi-function logic 204 may also optimize resource settings, such as the maximum allowed number of outstanding split transactions, across the different functions to maximize the available resources for the entire device 200.

The following describes different values in the PCI configuration space that may need special handling for the virtual multi-function logic 204. A task is to combine the separate values from each of the functions into one value, which may control the aggregate device behavior.

Figure 3:
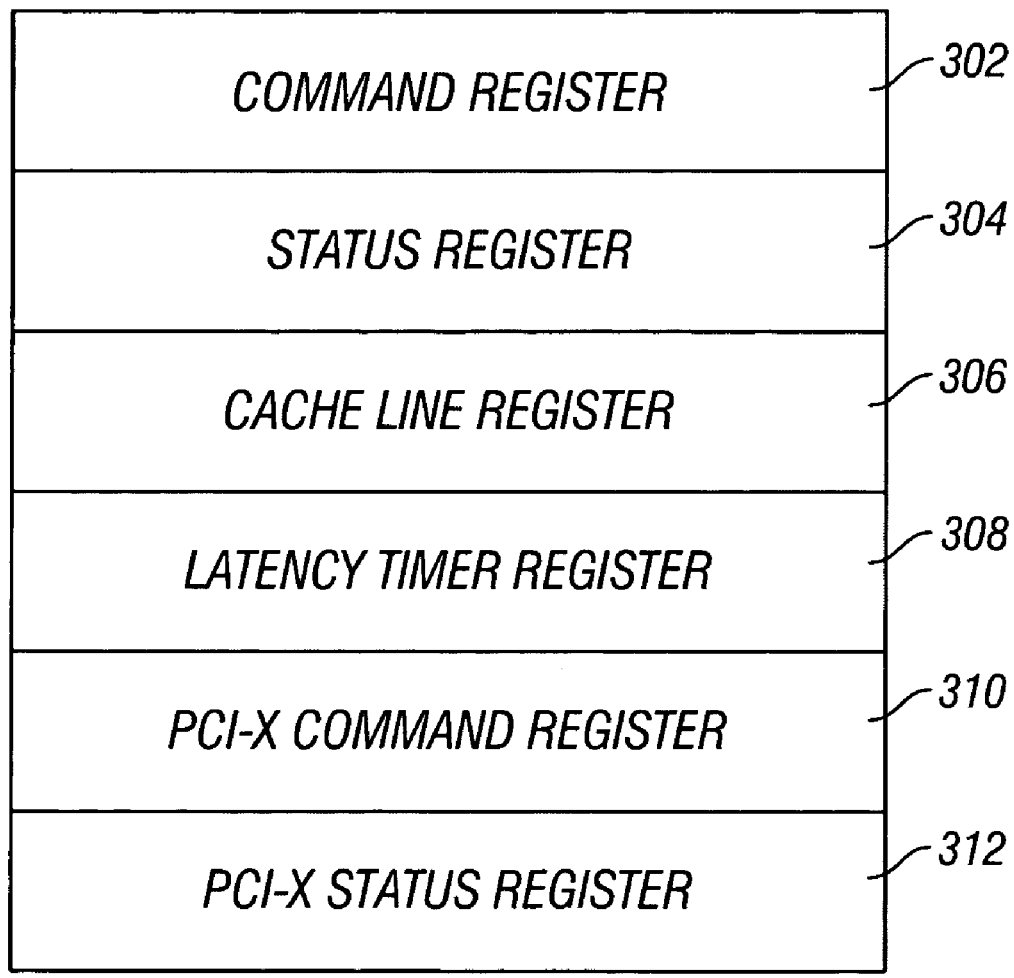
FIG. 3 illustrates set of registers associated with a function.

FIG. 3 illustrates set of registers 206 associated with a function, which may include a command register 302, a status register 304, a cache line size register 306, a latency timer register 308, a PCI-X command register 310 and a PCI-X status register 312. Each register may store a plurality of bits.

Command Register

The command register 302 may contain a number of bits defined by the PCI specification that control the operation of the function. A "Bus Master" Command bit 2 determines whether the function is allowed to master the PCI-X bus 102. When the Bus Master Command bit is cleared, the function is not allowed to initiate any transactions on the PCI-X bus 102. When the Bus Master Command bit is set, the function is allowed to initiate transactions on the PCI-X bus 102. The aggregate behavior of the device 200 may be equal to the logical "OR" of all the active functions' Bus Master enable bits. If any one of the functions' bus master enable bits is set, the device 200 is allowed to initiate transactions on the PCI-X bus 102.

An "MWI" Command bit 4 determines whether the function is allowed to use a memory write and invalidate (MWI) command. When the MWI bit is cleared, the MWI command is not to be used. When the MWI bit is set, the MWI command may be used. The aggregate device behavior may be equal to the logical "AND" of all the bus-master-enabled functions' MWI bits. Thus, if all of the bus master enabled functions have the MWI bits set, the aggregate device 200 is allowed to use the memory write and invalidate (MWI) command.

A "Parity Error Response" Command bit 6 determines whether the function should check parity and drive a "PERR" signal (defined by the PCI specification) on transactions that the function masters. When the Parity Error Response bit is cleared, the function should not check parity, and should not assert "PERR." When the Parity Error Response bit is set, the function should check parity and assert "PERR" when a parity error is detected. The aggregate device behavior may be equal to the logical "OR" of all the active functions' Parity Error Response bits. When any of the active functions have the Parity Error Response bit set, the device 200 will check parity and drive PERR if a parity error is detected.

A "SERR Enable" Command bit 8 determines whether the function is allowed to enable a SERR driver (defined by the PCI specification). When the SERR Enable Command bit is cleared, the function is not allowed to enable the SERR driver. When the SERR Enable Command bit is set, the function may enable the SERR driver. The aggregate device behavior may be equal to the logical "OR" of the active functions' SERR Enable command bits. Thus, if any of the active functions have the SERR Enable Command bit set, the device 200 may assert SERR.

A "Fast Back-to-Back Enable" Command bit 9 determines whether the function is allowed to perform fast back-to-back transactions. When the Fast Back-to-Back Enable Command bit is cleared, the function is not allowed to perform fast back-to-back transactions. When the Fast Back-to-Back Enable Command bit is set, the function may perform fast back-to-back transactions. The aggregate device behavior may be equal to the logical "AND" of the bus-master-enabled functions' Fast Back-to-Back Enable Command bits. Thus, if all of the bus-master-enabled functions have the Fast Back-to-Back Enable Command bit set, the device 200 may perform fast back-to-back transactions.

Status Register

The status register 304 may be defined by the PCI specification and may contain a plurality of bits that indicate the function's status. A few bits may have special treatment for the virtual multi-function device 200.

A "Master Data Parity Error" Status bit 24 may indicate that a parity error on a mastered transaction was detected. This bit may be set in a given function if the corresponding Command bit 6 is set for that function, and the aggregate device 200 detected a parity error on a mastered transaction (defined in the PCI specification).

A "Signaled System Error" Status bit 30 indicates the device 200 drove the SERR driver. This bit may be set in a given function if the corresponding Command bit 8 is set for that function, and the aggregate device 200 drove SERR.

"Signaled Target Abort" Status bit 27, "Received Target Abort" Status bit 28, "Received Master Abort" Status bit 29, and "Detected Parity Error" Status bit 31 may indicate various PCI errors. These error bits may be set on all functions if the aggregate device 200 encounters the corresponding error.

Cache Line Size Register

The cache line size register 306 may be defined by the PCI specification and may inform the function of the cache line size of a host, e.g., processor 104 in FIG. 1. When the cache line size register is programmed to a value other than zero, the function is allowed to make optimizations based on the cache line size. These optimizations may include the use of block read and write commands defined by the PCI specification: Memory Read Line, Memory Read Multiple, and Memory Write Invalidate.

The aggregate device behavior may be as follows. If the cache line size registers of all bus-master-enabled functions are programmed to an identical value, then the aggregate device 200 may use that value. Otherwise, the aggregate device 200 may use a cache line size of "0" (the invalid value).

Latency Timer Register

The latency timer register 308 may be defined by the PCI specification and may indicate a maximum amount of time the function can use the bus 102 if a grant is revoked. When the aggregate device 200 masters transactions, the aggregate device 200 uses a value equal to the minimum of all the bus-master-enabled functions' values of the latency timer registers 308.

PCI-X Command Register

The PCI-X command register 310 may be defined by the PCI-X specification and may contain a number of bits that control the PCI-X behavior of the device 200. A "Data Parity Error Recovery" Command bit 16 may control the ability of the function to recover from parity errors. When the "Data Parity Error Recovery" Command bit is set, the function may attempt data parity error recovery. When this bit is cleared, the function should not attempt data parity error recovery. The aggregate device behavior may be equal to the logical "AND" of all the bus-master-enabled functions' bits. Thus, if all the bus-master-enabled functions have this bit set, the aggregate device 200 may attempt to recover from data parity errors.

An "Enable Relaxed Ordering" Command bit 17 may control the ability of the function to set the relaxed ordering ("RO") bit in mastered transactions (defined in the PCI and/or PCI-X specifications). When the Enable Relaxed Ordering bit is set, the function may set the relaxed ordering "RO" bit. When the Enable Relaxed Ordering bit is cleared, the function should not set the "RO" bit. The aggregate device behavior may be equal to the logical "AND" of all the bus-master-enabled functions' Enable Relaxed Ordering bits. Thus, if all the bus-master-enabled functions have this bit set, the aggregate device 200 may set the "RO" bit in mastered transactions.

"Maximum Memory Read Byte Count" Command bits 18–19 may limit a maximum size read that a function may perform. A mastered read (defined in the PCI and/or PCI-X specifications) may not be requested if the mastered read is larger than the value of the Maximum Memory Read Byte Count bits. The aggregate device behavior may be the minimum of all the bus-master-enabled functions' Maximum Memory Read Byte Count fields. Thus, the maximum size read that may be requested by the aggregate device 200 may be the smallest of the programmed Maximum Memory Read Byte Count fields to all bus-master-enabled functions.

"Maximum Outstanding Split Transactions" Command bits 20–22 may control the maximum number of outstanding split transactions (defined in the PCI and/or PCI-X specifications) that the function is allowed to have. Once the number of indicated outstanding splits has been reached, the function should not request any more transactions that could be split. The aggregate device behavior is to use a value equal to the sum of all the bus-master-enabled functions' Maximum Outstanding Split Transactions" Command fields. This allows the aggregate device 200 to use all the splits allocated to all the functions.

PCI-X Status

A PCI-X Status register 312 may be defined by the PCI-X specification and reports various status information for PCI-X operation. Some bits may be affected by virtual multi-function behavior. Status bit 29, "Received Split Completion Error" Status bit 19, "Unexpected Split Completion" Status bit 18, and "Split Completion Discarded" bit may be set in all active functions when the aggregate device 200 detects the corresponding condition.

PCI-X Function Use

Different function numbers may be used to remain compliant with PCI/PCI-X protocol and to reach the maximum possible number of outstanding splits without violating the maximum number of outstanding splits on any given function.

When the aggregate device 200 masters a transaction on PCI-X bus 102, the function number may be part of the information that is transferred on the bus 102. The aggregate device 200 should select a function number that is valid for each transaction based on a number of conditions.

Figure 4:
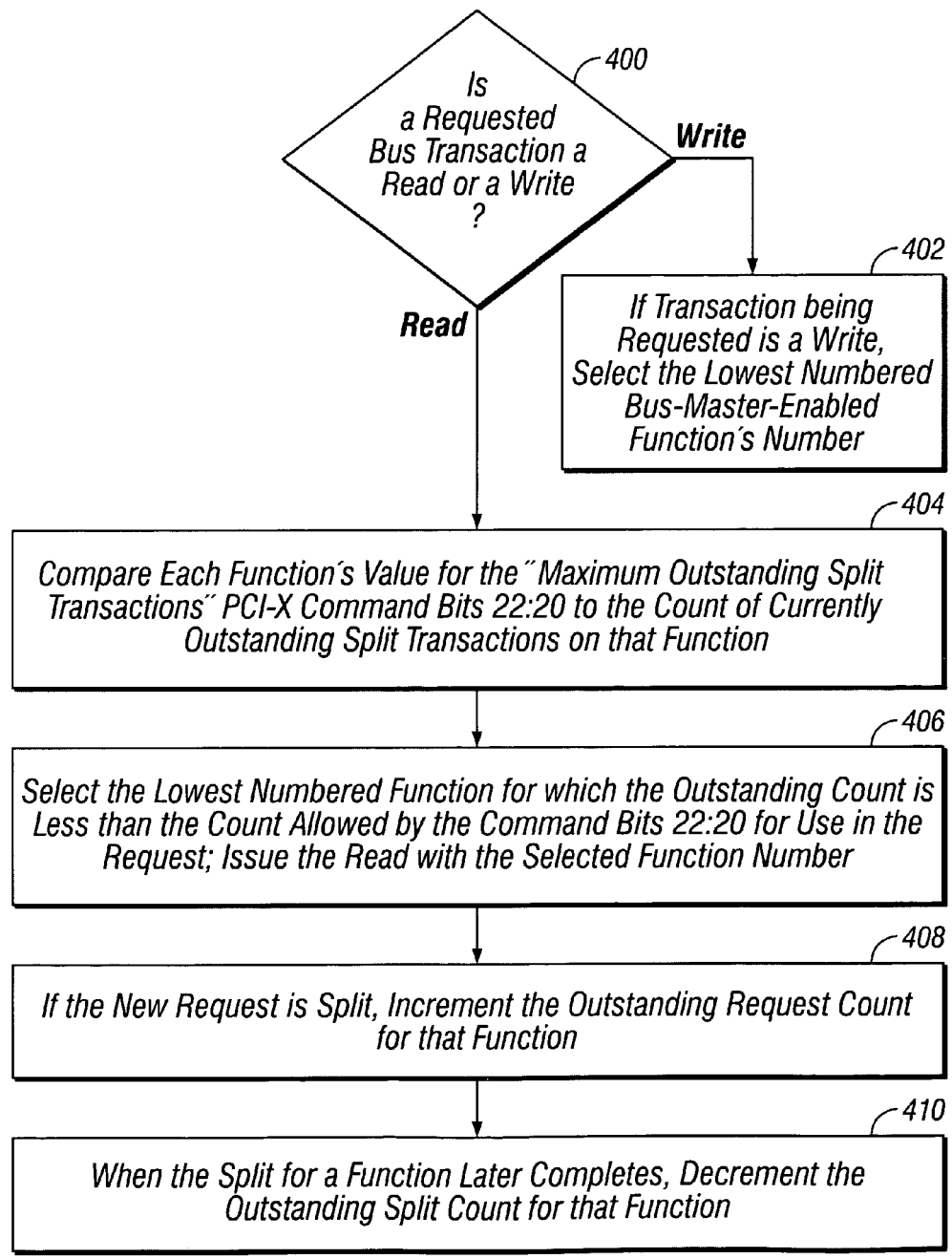
FIG. 4 illustrates a method of selecting a function number.

FIG. 4 illustrates a method of selecting a function number. The method may determine if the requested bus transaction is a read or a write at 400. If the transaction being requested is a write, the device 200 may select the lowest numbered bus-master-enabled function's number at 402.

If the transaction being requested is a read, the device 200 (e.g., the virtual multi-function logic 204) may use the following process for functions that are enabled and bus-master-enabled.

Starting with the lowest numbered function and working to the highest numbered function, compare each function's value for the "Maximum Outstanding Split Transactions" PCI-X Command register bits 22:20 to the count of currently outstanding split transactions on that function at 404;

Select the lowest numbered function for which the current outstanding split count (splits issued on that function) is less than the count allowed by the "Maximum Outstanding Split Transactions" PCI-X Command register bits 22:20 for use in the request at 406; issue the read with the selected function number;

If the new read request is split, increment the outstanding split request count for that function at 410; and When the split read for a function later completes, decrement the outstanding split count for that function on which the read was issued at 412.

A number of embodiments have been described. Nevertheless, it will be understood that various modifications may be made without departing from the spirit and scope of the application. Accordingly, other embodiments are within the scope of the following claims.

What is claimed is:

1. A device comprising:
   a bus interface coupled to a component interconnect bus and being associated with a communications standard;
   a plurality of configuration space register sets, each configuration space register set being associated with a function of the device; and
   multiple-function logic coupled to the bus interface and the configuration space register sets, the multiple-function logic being adapted to coordinate the communications of a plurality of functions of the device over the component interconnect bus in accordance with the communications standard,
   wherein each function corresponds to a set of behaviors which is treated by the communications standard as an separate entity.

2. The device of claim 1, wherein the bus interface is a Peripheral Component Interconnect bus interface coupled to a Peripheral Component Interconnect bus, and the communications protocol is the Peripheral Component Interconnect standard.

3. The device of claim 1, wherein the multiple-function logic is adapted to handle a plurality of Peripheral Component Interconnect functions.

4. The device of claim 1, wherein the bus interface is a Peripheral Component Interconnect Extended (PCI-X) bus interface coupled to a Peripheral Component Interconnect Extended bus and the communications protocol is the PCI-X standard.

5. The device of claim 1, wherein the device is an application specific integrated circuit.

6. The device of claim 1, wherein each set of configuration space registers comprises a command register, the multiple-function logic using bits from a plurality of command registers associated with a plurality of functions to control the device.

7. The device of claim 1, wherein each set of configuration space registers comprises a status register, the multiple-function logic using bits from a plurality of status registers associated with a plurality of functions to control the device.

8. The device of claim 1, wherein each set of configuration space registers comprises a cache line size register, the multiple-function logic using bits from a plurality of cache line size registers associated with a plurality of functions to control the device.

9. The device of claim 1, wherein each set of configuration space registers comprises latency timer register, the multiple-function logic using bits from a plurality of latency timer registers associated with a plurality of functions to control the device.

10. The device of claim 1, wherein each set of configuration space registers comprises a Peripheral Component Interconnect Extended (PCI-X) command register, the multiple-function logic using bits from a plurality of Peripheral Component Interconnect Extended (PCI-X) command registers associated with a plurality of functions to control the device.

11. The device of claim 1, wherein each set of configuration space registers comprises a Peripheral Component Interconnect Extended (PCI-X) status register, the multiple-function logic using bits from a plurality of Peripheral Component Interconnect Extended (PCI-X) status registers associated with a plurality of functions to control the device.

12. The device of claim 1, wherein the multiple-function logic coordinates a plurality of configuration space registers for a plurality of functions.

13. The device of claim 1, wherein the multiple-function logic enables a plurality of functions to share the bus interface.

14. The device of claim 1, wherein the multiple-function logic enables a plurality of functions to share internal device logic.

15. The device of claim 1, wherein the multiple-function logic enables a plurality of functions to share internal resources of the device.

16. The device of claim 1, further comprising a Peripheral Component Interconnect Extended (PCI-X) master interface logic shared by a plurality of functions.

17. The device of claim 1, further comprising a Peripheral Component Interconnect Extended (PCI-X) slave interface logic shared by a plurality of functions.

18. The device of claim 1, further comprising control registers shared by a plurality of functions.

19. The device of claim 1, further comprising a processing unit shared by a plurality of functions.

20. The device of claim 1, further comprising a memory shared by a plurality of functions.

21. The device of claim 1, further comprising a direct memory access controller shared by a plurality of functions.

22. A system comprising:
   a host processor;
   a local bus coupled to the host processor and being associated with a communications standard; and
   a multiple-function device coupled to the local bus, the multiple-function device comprising:
      a bus interface, connected to the communications bus and being associated with the communications standard;
      a plurality of configuration space register sets, each configuration space register set being associated with a function of the multiple-function device; and
      multiple-function logic coupled to the bus interface and the configuration space register sets, the multiple-function logic being adapted to coordinate the communications of a plurality of functions of the device, over the component interconnect bus in accordance with the communications standard,
   wherein each function corresponds to a set of behaviors which is treated by the communications standard as an separate entity.

* * * * *